(12) United States Patent
Murugesan et al.

(10) Patent No.: US 8,054,050 B2
(45) Date of Patent: Nov. 8, 2011

(54) CIRCUIT AND METHOD FOR REDUCING A VOLTAGE BEING DEVELOPED ACROSS A FIELD WINDING OF A SYNCHRONOUS MACHINE

(75) Inventors: Mohan Murugesan, Karanataka (IN); Rajeev Verma, Karnataka (IN); Charles Earl Cooper, Erie, PA (US); Bret Dwayne Worden, Union City, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/953,600

(22) Filed: Nov. 24, 2010

(65) Prior Publication Data

US 2011/0062709 A1    Mar. 17, 2011

Related U.S. Application Data

(62) Division of application No. 11/761,546, filed on Jun. 12, 2007, now Pat. No. 7,847,424.

(51) Int. Cl.
*F02D 9/04* (2006.01)
*H02P 9/00* (2006.01)
(52) U.S. Cl. .................................. 322/44; 290/40 B
(58) Field of Classification Search ........... 290/40 B, 290/40 C, 40 R, 4 R, 1 A; 322/29, 27, 44
See application file for complete search history.

(56) References Cited

U.S. PATENT DOCUMENTS

| | | | |
|---|---|---|---|
| 2,907,943 A | 10/1959 | Orvis | |
| 4,585,982 A * | 4/1986 | Cooper et al. | 318/723 |
| 5,530,617 A | 6/1996 | Bonavia et al. | |
| 5,691,625 A | 11/1997 | Kumar et al. | |
| 5,992,950 A | 11/1999 | Kumar et al. | |
| 6,023,137 A * | 2/2000 | Kumar et al. | 318/400.27 |
| 6,452,370 B1 | 9/2002 | Frank | |
| 2006/0255656 A1* | 11/2006 | Linebach et al. | 303/113.2 |
| 2007/0142985 A1 | 6/2007 | Kumar | |
| 2007/0170724 A1* | 7/2007 | Calley | 290/44 |
| 2007/0219683 A1* | 9/2007 | Daum et al. | 701/19 |
| 2008/0077285 A1 | 3/2008 | Kumar et al. | |

* cited by examiner

*Primary Examiner* — Julio Gonzalez
(74) *Attorney, Agent, or Firm* — Robert Wawrzyn, Esq.; Terry M. Sanks, Esq.; Beusse Wolter Sanks Mora & Maire, P.A.

(57) ABSTRACT

In an electrical power system of a diesel powered system having at least one diesel-fueled power generation unit, the electrical power system configurable in a starting mode for cranking the diesel fueled power unit, the electrical power system having a synchronous machine coupled to the diesel-fueled power generation unit, the synchronous machine having a field winding connected in a parallel relationship with a current conditioner, a method for reconfiguring a baseline circuit topology of the electrical power system for controlling a voltage being developed across the field winding including uncoupling the field winding from the parallel relationship with the current conditioner, and coupling the field winding in a series relationship with the current conditioner.

20 Claims, 4 Drawing Sheets

CIRCUIT AND METHOD FOR REDUCING A VOLTAGE BEING DEVELOPED ACROSS A FIELD WINDING OF A SYNCHRONOUS MACHINE

CROSS-REFERENCE TO RELATED APPLICATIONS

This application claims priority to and is a Divisional of U.S. application Ser. No. 11/761,546 filed Jun. 12, 2007 now U.S. Pat. No. 7,847,242, and incorporated herein by reference in its entirety.

BACKGROUND OF THE INVENTION

The field of the invention relates to a diesel powered system, such as a train, off highway vehicle, marine and/or stationary diesel powered system and, more particularly, to a circuit for reducing a voltage being developed across a synchronous machine field winding of a diesel-fueled power generation unit.

Diesel powered systems such as, but not limited to, off-road vehicles, marine diesel powered propulsion plants, stationary diesel powered system and rail vehicle systems, or trains, are usually powered by a diesel power unit. With respect to rail vehicle systems, the diesel power unit is part of at least one locomotive and the train further includes a plurality of rail cars, such as freight cars. Locomotives are complex systems with numerous subsystems, with each subsystem being interdependent on other subsystems.

A diesel-electric locomotive typically includes a diesel internal combustion engine coupled to drive a rotor of at least one traction alternator to produce alternating current (AC) electrical power. The traction alternator may be coupled to power one or more electric traction motors. In a typical application, the diesel internal combustion engine is started, or cranked, using the traction alternator. On or more cranking batteries are configured for powering an inverter coupled to the traction alternator to drive the rotor of the alternator, and, in turn, crank the engine until the engine is capable of running on its own. In a typical embodiment, battery current-fed third-harmonic inverters are used for supplying variable frequency alternating current to three-phase stator windings of the traction alternator. In such a system, the rotor of the alternator is coupled to a mechanical load comprising the crankshaft of the engine. Initially, the output torque of the rotor (and hence the magnitude of current in the stator windings) needs to be relatively high in order to start turning the crankshaft. As the rotor accelerates from rest, less torque (and current) is required, and the fundamental frequency of load current increases with speed. In its cranking mode of operation, the inverter supplies the alternator with current of properly varying magnitude and frequency until the engine crankshaft is rotating at a rate that equals or exceeds the minimum speed at which normal running conditions of the engine can be sustained.

FIG. 1 illustrates a schematic block diagram of a prior art electrical power system 10 of a type using traction alternators for cranking an engine 16 of a locomotive. The system 10 includes an alternator field circuit 54 and a third harmonic auxiliary impulse commutated inverter 31 having a pair of dc terminals 19p and 19n connected to a source of relatively smooth direct current. The inverter 31 may include a set of three ac terminals 11, 12, and 13 connected, respectively, to line terminals of three star-connected armature windings on the stator of a rotatable, variable speed, three-phase ac synchronous machine, such as a traction alternator 14. As is suggested by broken lines 23a and 23b, multiple traction motors (not shown) may be connected to receive power from the dc terminals 19p and 19n, if desired. Traction alternator 14 has a rotor 15 that is mechanically coupled to a prime mover, such as a diesel internal combustion engine 16 of a locomotive. The current source for the inverter 31 comprises the combination of a source of voltage, such as a heavy duty electric storage battery 17, in series with an impedance which has appreciable electrical inductance, preferably provided by a dc field winding 18 on rotor 15 of machine 14.

Battery 17 may include a lead-acid or nickel-cadmium type having thirty-two cells and rated 68 volts; and the average magnitude of voltage at its terminals normally does not exceed 76 volts. Its internal resistance is typically in the range of 16 to 37 milliohms. The battery 17 is intended to supply electrical energy for starting the engine 16, and the system shown in FIG. 1 can successfully perform this function with the battery voltage as low as 61 volts.

Synchronous machine 14 may be configured for dual modes of operation, that is, in a powering mode as a generator for supplying alternating current to an electric load circuit that is connected to its stator windings, and in a starting mode as an ac motor for cranking, or starting, engine 16. In its generating mode, rotor 15 of the machine is driven by the crankshaft of engine 16, and field winding 18 is energized by a suitable excitation source 20 (e.g., the rectified output of auxiliary windings on the stator of machine 14) to which it is connected by means of a suitable contactor 47 which is operated by a conventional actuating mechanism 21. For example, the contactor 47 may be opened in the starting mode to disconnect excitation source 20 from the field winding 18 during cranking and closed in the powering mode to excite the field winding 18.

In the motoring mode of operation, rotor 15 of synchronous machine 14 drives the crankshaft of engine 16. Electrical energy is supplied from battery 17 to the windings on both the rotor and the stator of the machine, and rotor 15 generates torque to run the crankshaft and thereby crank the engine 16. As the rotor accelerates from rest, both the frequency and the RMS magnitude of the fundamental alternating voltage waveforms developed at the line terminals of the stator windings (i.e., the back emf) correspondingly increase, while load current (i.e., current in the field and armature windings) decreases in magnitude. Once the rotor is rotating faster than a predetermined rate, which typically is 240 rpm, the engine is presumed to be started and the motoring mode (i.e., engine cranking mode) of operation is discontinued.

The third harmonic auxiliary impulse commutated inverter 31 is operative to convert direct current from battery 17 into variable frequency alternating currents in the three different phases A, B, and C of the three-phase armature windings on the stator of machine 14. The inverter 31 has at least three pairs of alternately conducting main controllable electric valves interconnected and arranged in a three-phase, double-wye bridge configuration between the set of three ac terminals 11, 12, and 13 and the pair of dc terminals 10p and 10n. More particularly, a first pair of valves T1 and T4 are connected in series-aiding fashion from terminal 19p to terminal 19n, and their juncture, comprising terminal 11, is connected to phase A of the stator windings; a second pair of valves T3 and T6 are connected in series-aiding fashion from 19p to 19n, and their juncture, comprising terminal 12, is connected to phase B of the stator windings; and a third pair of valves T5 and T2 are connected in series-aiding fashion from 19p to 19n, and their juncture, comprising terminal 13, is connected to phase C. Each valve preferably comprises at least one solid state unidirectional controlled rectifier popularly known as a thyristor which has a turned on (conducting) state and a turned off (non-conducting) state. In practice, the valves are respectively shunted by conventional snubber circuits (not shown).

The first dc terminal 19p is connected to the relatively positive terminal of battery 17 via a contactor 48, and the second dc terminal 19n is connected to the other terminal of the battery 17 by means of a conductor 25, contactor 51, contactor 52, and a conductor 26. Field winding 18 typically has a resistance in the range of 0.12 to 0.28 ohm and an unsaturated inductance of more than 0.3 henries. Contactor 49, a conductor 27, and resistance 33 comprising two resistors 28 and 29 are connected in parallel with field winding 18 in the load current path between conductors 25 and 26. Resistors 28 and 29 are connected in series, and both have very low ohmic values, for example, the resistance of resistor 28 is approximately 14 milliohms, and the resistance of resistor 29 is shunted by another single-pole contactor 50 which, when closed, reduces the ohmic value of the resistance means 33 to that of the first resistor 28 alone.

An inductance 30 of approximately one milli-henry is connected in series with resistors 28 and 29 between second resistor 29 and conductor 26 in order to smooth the current flowing therethrough. Inductance 30 is shunted by a conventional over voltage protective device 35, the resistance of which is normally very high, but automatically decreases to a negligible amount in substantially instantaneous response to the magnitude of voltage across the inductor rising to a predetermined breakover level (e.g., 750 volts). A similar protective device 32 with bidirectional response is connected across field winding 18. Although protective devices 32, 35 are provided, the excitation source 20 may be disconnected form the field winding 18 so as to prevent damage to the excitation source 20 during cranking from over voltage. A resistor 36 of significant ohmic value (e.g., 100 ohms) is also connected across field winding 18 to enable thyristor "latching" current to bypass the field winding 18 and inductance 30 when battery current starts flowing to pre-charge the inverter's commutation capacitor 45. Capacitor 45 is shunted by a bleeder resistor 46 which effectively keeps the capacitor 45 initially in a substantially discharged state prior to closing contactors 48 and 49 and starting up the illustrated system. Preferably, the commutation capacitor is connected between the juncture M of the auxiliary valves and the neutral S of the three star-connected stator windings.

With field winding 18 in the load current path during engine cranking, synchronous machine 14 will operate with a characteristic similar to that of a series dc motor, namely, high current and hence desirably high starting torque, at low speeds. The resistance means 28 and 29 in parallel with the field winding 18 reduces the ohmic value of resistance that the field winding 18 alone would otherwise introduce in this path, thereby initially allowing a higher magnitude of armature current and later, as speed increases, providing automatic field weakening which permits the machine to run at a higher speed. Initially, load current is limited by the internal resistance of battery 17 as well as other resistance in its path and as speed increases, it is limited by the back emf of the armature (i.e., stator) windings. Thus, load current and torque tend to decrease with increasing speed. A short time after cranking commences, contactor 50 is closed to further reduce the amount of resistance in parallel with the field 18, thereby permitting more load current to flow and hence more torque to be developed at higher speeds as compared to the quantities that would be achieved if the parallel resistance were not so reduced.

When the cranking mode of operation commences, contactor 47 is opened so as to prevent damage to the excitation source 20 during cranking due to voltage spikes, and all of the contactors in the load current path between battery 17 and dc terminals 10p and 10n are closed, except 50. Contactor 50 is closed upon the expiration of a predetermined length of time after cranking commences. Thereafter, in response to the speed of the engine attaining a threshold that marks the conclusion of cranking (e.g., 240 rpm), and therefore the successful starting of the engine 16, all of the previously closed contactors are opened. Upon opening contactors 51, 52, field winding 18 is disconnected from the load current path between conductors 25 and 26, and contactor 47 is then closed by its actuating mechanism 21 in order to reconnect the field to the normal excitation source 20.

Owners and/or operators of locomotives, off-road vehicles, marine diesel powered propulsion plants, and/or stationary diesel powered systems desire to improve reliability and reduce maintenance costs associated with such systems.

BRIEF DESCRIPTION OF THE INVENTION

In an electrical power system of a diesel powered system having at least one diesel-fueled power generation unit, the electrical power system being configurable in a starting mode for cranking the diesel fueled power unit, the electrical power system having a synchronous machine including a field winding being coupled to the diesel-fueled power generation unit, a battery for selectively providing a starting current during a starting mode of the electrical power system, and an inverter receiving the starting current for driving the synchronous machine and generating an inverter current, an exemplary embodiment of the invention includes a circuit for reducing a voltage being developed across the field winding. The circuit includes a current conditioner for conditioning the inverter current and a parallel circuit interposed between the inverter and the current conditioner comprising a first branch including a resistance and a second branch including the field winding of the synchronous machine so that the parallel circuit is isolated from a voltage developed across the current conditioner during cranking.

In another exemplary embodiment, a circuit of the electrical power system for reducing a voltage being developed across the field winding includes a current conditioner for conditioning the inverter current and a field winding of the synchronous machine connected in series with the current conditioner so that the field winding is isolated from a voltage developed across the current conditioner.

In another exemplary embodiment, a method for reconfiguring a baseline circuit topology of the electrical power system for controlling a voltage being developed across the field winding includes uncoupling the field winding from the parallel relationship with the current conditioner and coupling the field winding in a series relationship with the current conditioner.

In another exemplary embodiment, based on the circuits identified above, a method for reducing a voltage being developed across the field winding is provided comprising conditioning an inverter current with a current conditioner, and isolating a parallel circuit from a voltage developed across a current conditioner during cranking so that the parallel circuit is isolated from a voltage developed across the current conditioner.

In another exemplary embodiment, also based on the circuits identified above, a method for reducing a voltage being developed across the field winding is provided comprising isolating a field winding of a synchronous machine connected in series with a current conditioner from a voltage developed across the current conditioner, connecting the field winding in series with the current conditioner, and isolating the field winding from a voltage developed across the current conditioner.

BRIEF DESCRIPTION OF THE DRAWINGS

A more particular description of the invention briefly described above will be rendered by reference to specific embodiments thereof that are illustrated in the appended drawings. These drawings depict only typical embodiments of the invention and are not therefore to be considered to be limiting of its scope.

DETAILED DESCRIPTION OF THE INVENTION

Figure 1:
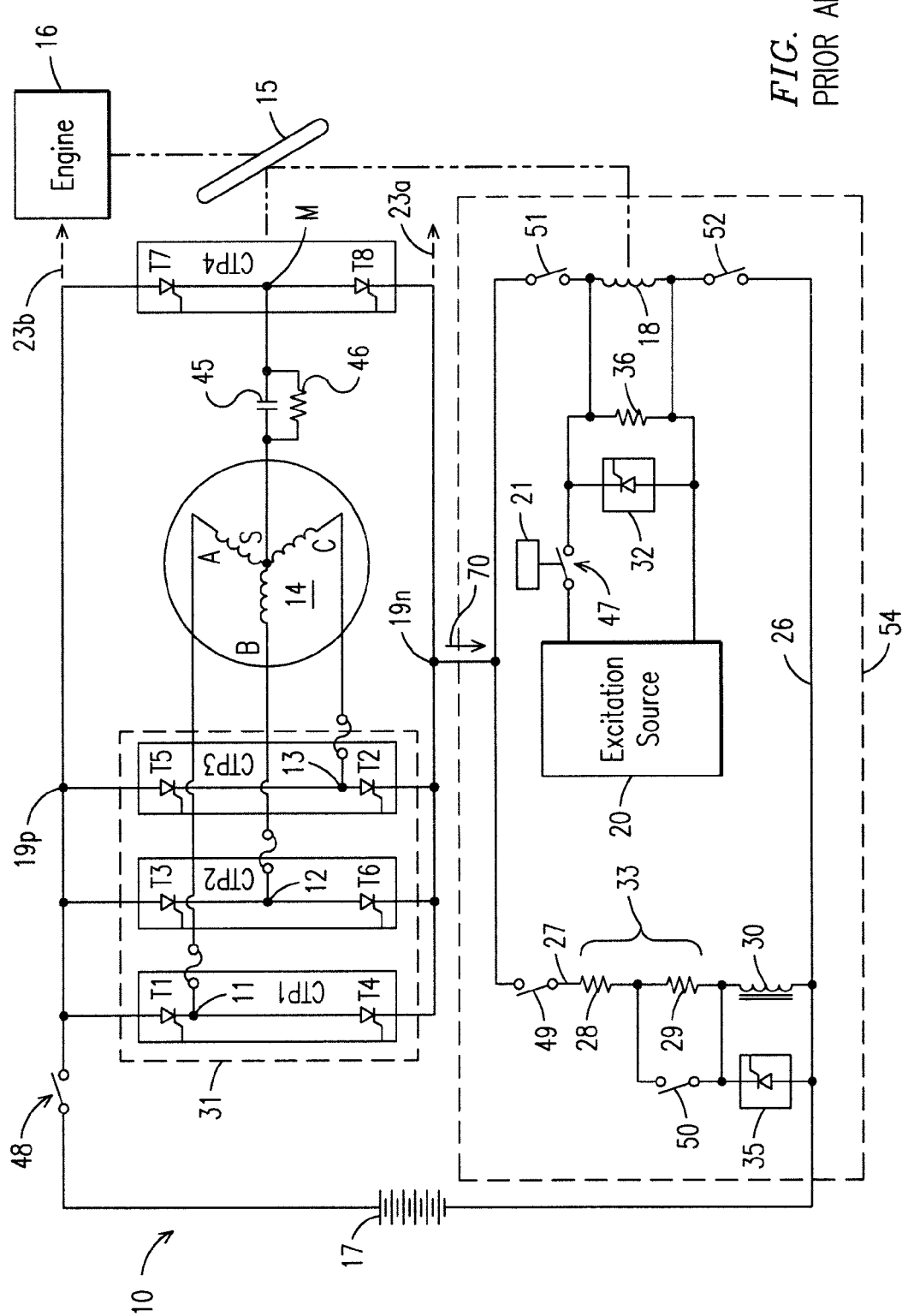
FIG. 1 is a schematic block diagram of a prior art electrical power system of a type using traction alternators for cranking an engine.

Reference will now be made in detail to the embodiments consistent with the invention, examples of which are illustrated in the accompanying drawings. Wherever possible, the same reference numerals are used throughout the drawings and refer to the same or like parts.

Though exemplary embodiments of the present invention are described with respect to rail vehicles, specifically trains and locomotives having diesel engines, exemplary embodiments of the invention are also applicable for other uses, such as but not limited to off-road vehicles, marine vessels, and stationary units, each which may use a diesel engine. For example, with respect to a stationary power generating station, a plurality of stations may be grouped together collectively generating power for a specific location and/or purpose. In another exemplary embodiment, a single station is provided, but with a plurality of generators making up the single station. Towards this end, when discussing a specified mission, this includes a task or requirement to be performed by the diesel powered system. Therefore, with respect to railway, marine or off-road vehicle applications this may refer to the movement of the system from a present location to a destination. In the case of stationary applications, such as but not limited to a stationary power generating station or network of power generating stations, a specified mission may refer to an amount of wattage (e.g., MW/hr) or other parameter or requirement to be satisfied by the diesel powered system. Likewise, operating condition of the diesel-fueled power-generating unit may include one or more of speed, load, fueling value, timing, etc.

In one exemplary example involving marine vessels, a plurality of tugs may be operating together where all are moving the same larger vessel, where each tug is linked in time to accomplish the mission of moving the larger vessel. In another exemplary example a single marine vessel may have a plurality of engines. Off Highway Vehicle (OHV) may involve a fleet of vehicles that have a same mission to move earth, from location A to location B, where each OHV is linked in time to accomplish the mission.

Diesel engine powered locomotives typically include an electrical cranking system that uses one or more traction alternators for cranking the engine. However, conventional cranking circuits used in the cranking system may generate high amplitude voltages, such as voltage spikes, across the field winding of the alternator during cranking, requiring protection of circuit components susceptible to damage by such voltage spikes. By recognizing that these voltage spikes may be greatly reduced by reconfiguring a baseline circuit topology associated with the field windings, the inventors have developed an improved power circuit having reduced voltage spikes being generated across the field windings. Advantageously, voltage stress on the field windings of the traction alternator may be reduced and the elimination of a contact for disconnecting an excitation source from the field winding may be achieved.

Figure 2:
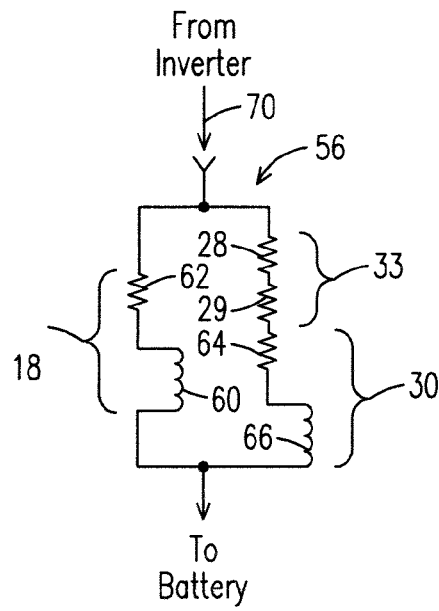
FIG. 2 is an equivalent circuit of the alternator field circuit of the prior art electrical power system of FIG. 1

In prior art cranking circuits, such as shown FIG. 1, an equivalent circuit 56 of the alternator field circuit 54 may be schematically depicted as shown in FIG. 2. The field winding 18, which may include an inductive element 60 and a resistive element 62, is wired in parallel with the series combination of resistance 33, comprising resistive elements 28, 29, and the inductance 30, which may include an inductive element 66 and a resistive element 64. Consequently, any voltage developed over the series combination of resistance 33 and inductance 30 appears across the field windings 18. For example, during cranking, peak voltage amplitudes, or voltage spikes, of 740 volts or more may appear across the field windings 18 connected in parallel with the inductance 30. Such high peak voltages may contribute to electrical stress in the windings and may require isolation of sensitive components wired in parallel with the windings 18, such as the excitation source.

The inventors have further recognized that voltage peak amplitudes generated during cranking primarily develop across inductance 30. Accordingly, by innovatively reconfiguring the alternator field circuit 54 to remove the inductance 30 from the parallel relationship with the field windings 18, voltage levels developed across the field winding 18 may be greatly reduced compared, for example, to a conventional alternator field circuit 54.

Figure 4:
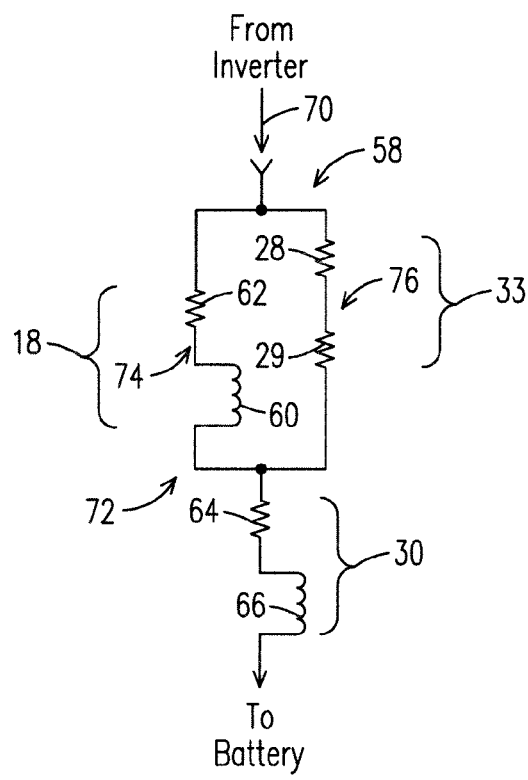
FIG. 4 is an equivalent circuit of the alternator field circuit of the improved electrical power system of FIG. 3
Figure 3:
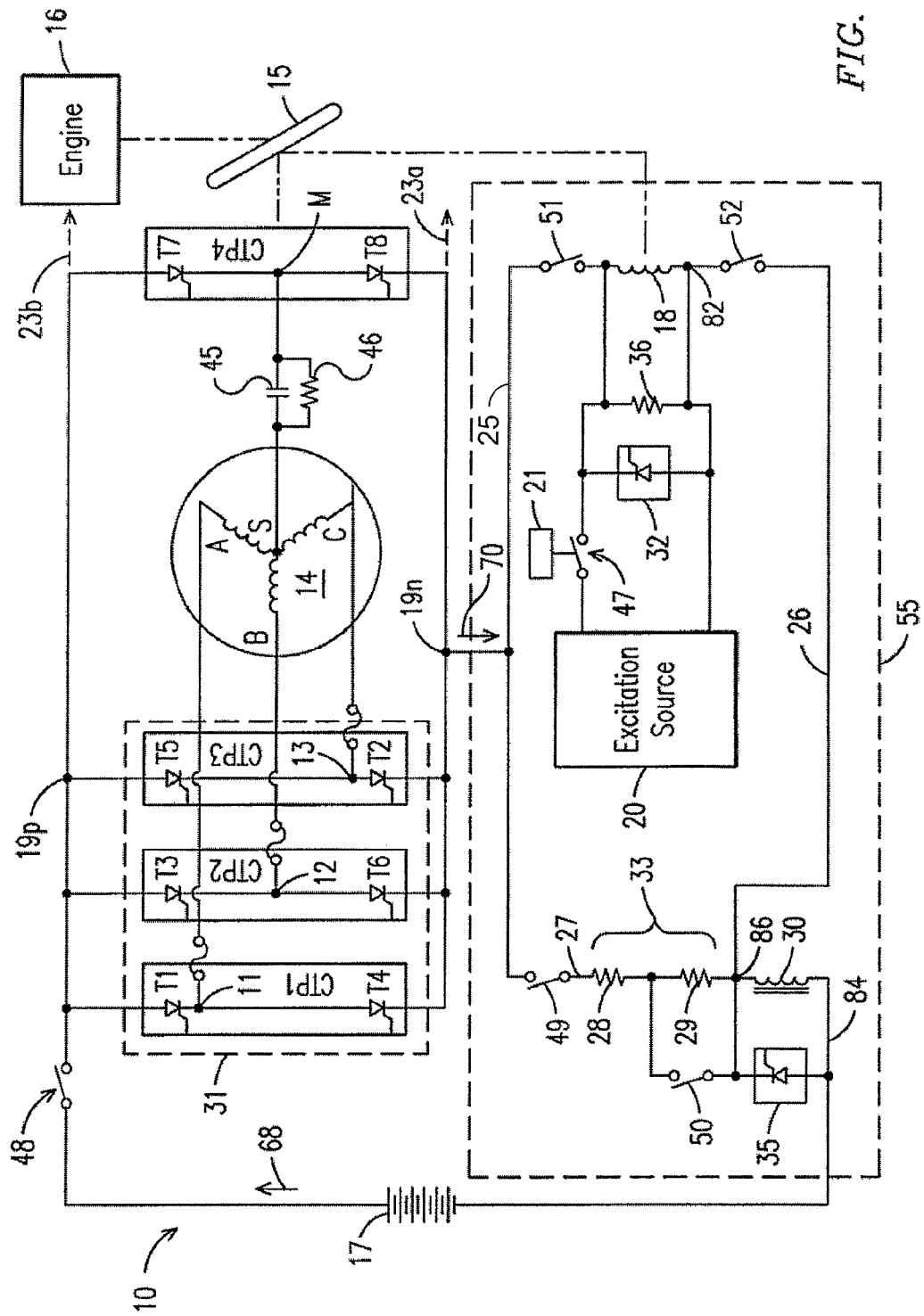
FIG. 3 is a schematic block diagram of an embodiment of an improved electrical power system of a type using traction alternators for cranking an engine.

In an example embodiment of the invention shown in FIG. 3 and the equivalent circuit 58 of FIG. 4, may include a power source, such as a battery 17, for selectively providing a starting current 68 during a starting mode of the electrical power system 10. The inverter 32 may receive the starting current 68 for driving the synchronous machine, such as the traction alternator 14, of the electrical power system 10 and for generating an inverter current 70. A current conditioner, such as inductance 30, may be provided for conditioning the inverter current 70.

In an aspect of the invention, an improved alternator field circuit 55 may be provided for reducing voltage levels across the field winding 18. Instead of being wired in parallel as shown in the conventional equivalent circuit 56 of FIG. 2, the field winding 18 in the alternator field circuit 55 may be connected in series with the current conditioner, for example, inductance 66, so that the field winding 18 is isolated from any voltage developed across the current conditioner as it performs its current conditioning function of the inverter current 70. In an embodiment, the field winding 18 may be configured in a parallel circuit 72 interposed between the inverter 31 and the current conditioner. The parallel circuit 72 may include a first branch 74 including resistance 33 and a second branch 76 including the field winding 18 of the synchronous machine. Accordingly the parallel circuit 72 may be isolated from a voltage developed across the current conditioner in series with the parallel circuit 72.

Figure 5:
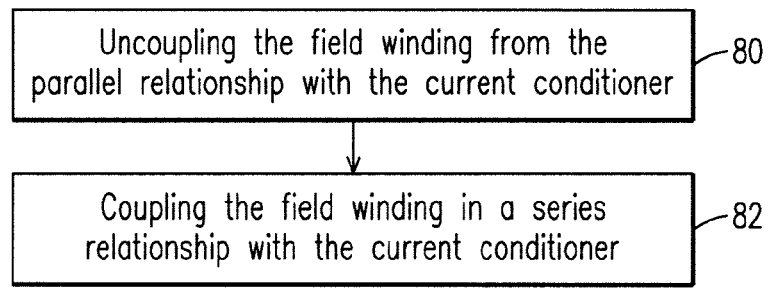
FIG. 5 shows a flow diagram for an exemplary method that may be used to reconfigure a conventional circuit topology of the electrical power system of FIG. 1 for controlling generation of a high level voltage across the field winding.

FIG. 5 shows a flow diagram 78 for an exemplary method that may be used to reconfigure a conventional, or baseline, circuit topology of the electrical power system 10 of FIG. 1 for controlling generation of high voltage levels across the field winding 18. The method may include, with reference to FIG. 3, uncoupling 80 the field winding 18 from the parallel relationship with the current conditioner, such as inductance 30. The method may then include coupling 82 the field winding 18 in a series relationship with the current conditioner. In an embodiment, uncoupling 80 may include disconnecting the conductor 26 connecting a first field winding node 82 from a first current conditioner node 84 on one side of the current conditioner. The method may then include connecting the conductor 26 to a second current conditioner node 86 at an opposite side of the current conditioner.

Figure 6:
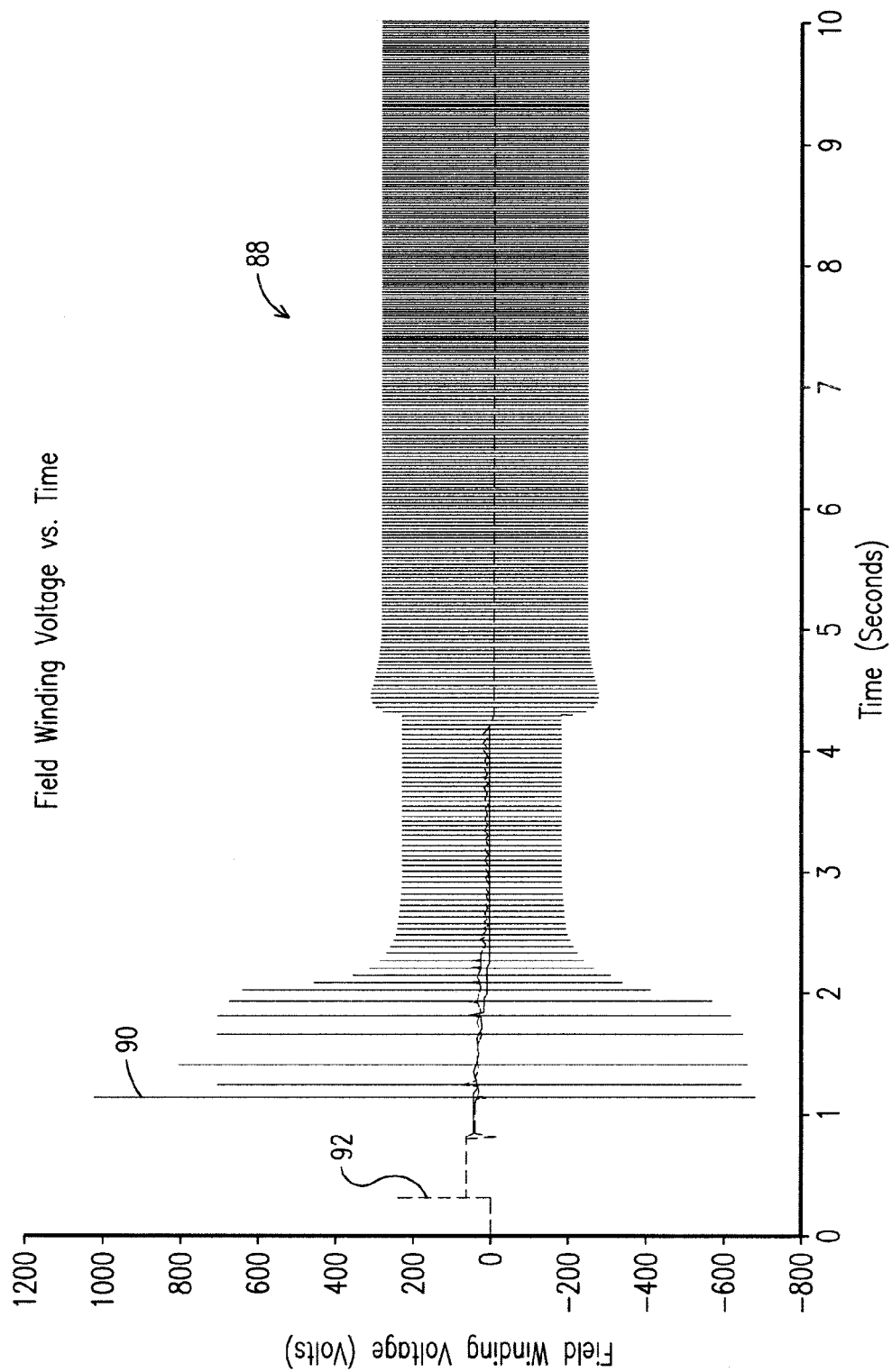
FIG. 6 shows an exemplary graph of voltage versus time during a cranking interval comparing voltage responses across the field winding of the prior art electrical power system of FIG. 1 and the field winding of the improved electrical power system of FIG. 3.

FIG. 6 shows an exemplary graph 88 of voltage versus time during a cranking interval comparing voltage responses 90, 92 across the field winding 18 for a conventional circuit 54 having the field winding 18 in parallel with the current conditioner and an improved circuit 55 having the field winding 18 in series with the current conditioner. As can be seen in the graph 88 the voltage response for the conventional circuit 54 exhibits swings from about 1000 volts to about −700 volts while the improved circuit 55 exhibits swings from about 200 volts to about 0 volts.

While exemplary embodiments of the invention have been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In an electrical power system of a diesel powered system having at least one diesel-fueled power generation unit, the electrical power system configurable in a starting mode for cranking the diesel fueled power unit, the electrical power system having a synchronous machine coupled to the diesel-fueled power generation unit, the synchronous machine having a field winding connected in a parallel relationship with a current conditioner, a method for reconfiguring a baseline circuit topology of the electrical power system for controlling a voltage being developed across the field winding comprising:
   uncoupling the field winding from the parallel relationship with the current conditioner; and
   coupling the field winding in a series relationship with the current conditioner and the inverter so that the field winding is isolated from a voltage developed across the current conditioner.

2. The method of claim 1, wherein uncoupling comprises disconnecting a conductor connecting a first field winding node from a first current conditioner node on one side of the current conditioner.

3. The method of claim 1, wherein coupling comprises connecting a conductor to a second current conditioner node at an opposite side of the current conditioner.

4. The method of claim 1, wherein the diesel powered system comprises a railway transportation system, and wherein the diesel-fueled power generating unit comprises at least one locomotive powered by at least one diesel internal combustion engine.

5. The method of claim 1, wherein the diesel powered system comprises a marine vessel, and wherein the diesel-fueled power generating unit comprises at least one diesel internal combustion engine.

6. The method of claim 1, wherein the diesel powered system comprises an off-road vehicle, and wherein the diesel-fueled power generating unit comprises at least one diesel internal combustion engine.

7. The method of claim 1, wherein the diesel powered system comprises a stationary power generating station, and wherein the diesel-fueled power generating unit comprises at least one diesel internal combustion engine.

8. The method of claim 1, wherein the diesel powered system comprises a network of stationary power generating stations, and wherein the diesel-fueled power generating unit comprises at least one diesel internal combustion engine.

9. In an electrical power system of a diesel powered system having at least one diesel-fueled power generation unit, the electrical power system being configurable in a starting mode for cranking the diesel fueled power unit, the electrical power system having a synchronous machine including a field winding being coupled to the diesel-fueled power generation unit, a battery for selectively providing a starting current during a starting mode of the electrical power system, and an inverter receiving the starting current for driving the synchronous machine and generating an inverter current, a method for reducing a voltage being developed across the field winding comprising:
   conditioning an inverter current with a current conditioner;
   connecting the field winding and a resistance in a parallel circuit; and
   connecting the parallel circuit in series between the inverter and the current conditioner so that the field winding is isolated from a voltage developed across the current conditioner in the starting mode.

10. The method of claim 9, wherein the diesel powered system comprises a railway transportation system, and wherein the diesel-fueled power generating unit comprises at least one locomotive powered by at least one diesel internal combustion engine.

11. The method of claim 9, wherein the diesel powered system comprises a marine vessel, and wherein the diesel-fueled power generating unit comprises at least one diesel internal combustion engine.

12. The method of claim 9, wherein the diesel powered system comprises an off-road vehicle, and wherein the diesel-fueled power generating unit comprises at least one diesel internal combustion engine.

13. The method of claim 9, wherein the diesel powered system comprises a stationary power generating station, and wherein the diesel-fueled power generating unit comprises at least one diesel internal combustion engine.

14. The method of claim 9, wherein the diesel powered system comprises a network of stationary power generating stations, and wherein the diesel-fueled power generating unit comprises at least one diesel internal combustion engine.

15. In an electrical power system of a diesel powered system having at least one diesel-fueled power generation unit, the electrical power system being configurable in a starting mode for cranking the diesel fueled power unit, the electrical power system having a synchronous machine including a field winding being coupled to the diesel-fueled power generation unit, a power source for selectively providing a starting current during a starting mode of the electrical power system, and an inverter receiving the starting current for driving the synchronous machine and generating an inverter current, a method for reducing a voltage being developed across the field winding comprising:

connecting a current conditioner in series with the inverter;
connecting the field winding in series with the current conditioner; and
isolating the field winding from a voltage developed across the current conditioner in the starting mode.

16. The method of claim 15, wherein the diesel powered system comprises a railway transportation system, and wherein the diesel-fueled power generating unit comprises at least one locomotive powered by at least one diesel internal combustion engine.

17. The method of claim 15, wherein the diesel powered system comprises a marine vessel, and wherein the diesel-fueled power generating unit comprises at least one diesel internal combustion engine.

18. The method of claim 15, wherein the diesel powered system comprises an off-road vehicle, and wherein the diesel-fueled power generating unit comprises at least one diesel internal combustion engine.

19. The method of claim 15, wherein the diesel powered system comprises a stationary power generating station, and wherein the diesel-fueled power generating unit comprises at least one diesel internal combustion engine.

20. The method of claim 15, wherein the diesel powered system comprises a network of stationary power generating stations, and wherein the diesel-fueled power generating unit comprises at least one diesel internal combustion engine.

* * * * *